United States Patent [19]

Knop

[11] 3,957,354
[45] May 18, 1976

[54] DIFFRACTIVE SUBTRACTIVE COLOR FILTERING TECHNIQUE

[75] Inventor: Karl Knop, Zurich, Switzerland

[73] Assignee: RCA Corporation, New York, N.Y.

[22] Filed: Feb. 3, 1975

[21] Appl. No.: 546,401

[52] U.S. Cl. .................. 350/162 SF; 350/162 R; 350/314
[51] Int. Cl.² .................................. G02B 27/38
[58] Field of Search ........... 350/3.5, 162 R, 162 SF, 350/311, 314; 346/77 E; 358/5, 7

[56] References Cited
UNITED STATES PATENTS

| | | | |
|---|---|---|---|
| 2,985,866 | 5/1961 | Norton | 350/162 R |
| 3,095,475 | 6/1963 | Brake | 350/162 R |
| 3,732,363 | 5/1973 | Glenn | 350/162 SF |
| 3,842,202 | 10/1974 | Coale | 350/162 R |

*Primary Examiner*—Ronald J. Stern
*Attorney, Agent, or Firm*—Edward J. Norton; George J. Seligsohn

[57] ABSTRACT

A subtractive color filtering technique, suitable for the projection of color pictures, employs diffraction, rather than color dyes, for discriminatingly subtracting unwanted spectral wavelength portions of polychromatic illuminating light. The useful output light may consist of solely the zero-order diffraction output light or, alternatively, one or a certain combination of diffraction orders other than the zero diffraction order (such as the aggregate of all diffraction orders other than the zero diffraction order which corresponds to the complement of the zero-order diffraction output light).

61 Claims, 11 Drawing Figures

3,957,354

DIFFRACTIVE SUBTRACTIVE COLOR FILTERING TECHNIQUE

This invention relates to a technique for subtractive color filtering and, more particularly, to such a technique, suitable for the projection of color pictures, which employs diffraction for discriminatingly subtracting unwanted spectral wavelength portions of polychromatic illuminating light.

Subtractive color filtering, as it is known in the art and as it is used either for projecting a color picture from a color transparency or merely for deriving a light beam of a particular color from a polychromatic (e.g. white) light source, employs one or more selected color dyes for discriminatingly absorbing certain unwanted spectral wavelength portions of polychromatic illuminating light and passing the remaining spectral wavelength portions of the polychromatic illuminating light. By necessity, the light energy of the unwanted absorbed light must be dissipated as heat within the medium of the color transparency by the dyes thereof. This is a disadvantage inherent in achieving subtractive color filtering with color dyes. Another disadvantage is the relatively high cost of a color transparency, employing color dyes, compared to that of a black-and-white transparency. This relatively high cost is an impediment to the widespread use of color transparencies for certain purposes, such as microfiche for example. A still further disadvantage is that the color characteristics of color dyes tend to deteriorate over extended periods of time.

In accordance with the principles of the present invention, it has been found that the zero diffraction order (or, alternatively, the aggregate of all diffraction orders other than the zero diffraction order) of a diffracting medium illuminated by polychromatic (e.g. white) illuminating light may be used to achieve subtractive color filtering without the need for any color dye. More specifically, the zero diffraction order color characteristics of a subtractive color filter employing a diffracting medium including a pattern of spatially distributed diffraction elements are determined solely by the waveform profile of each diffraction element and the absolute magnitude of the effective optical peak amplitude of this waveform profile. Further, these zero diffraction order characteristics are independent of the spatial frequency at which the diffraction elements occur so long as this spatial frequency has a value sufficiently high to deflect all diffraction orders other than the zero order beyond the aperture of the zero diffraction order. All diffraction orders other than the zero order constitute in the aggregate the complement (negative) of the zero order.

As is known in the optical art, a diffraction medium may be either reflective or transmissive. While the diffraction elements of a reflective refracting medium are normally manifested by a surface relief pattern, a transmissive non-absorbing diffracting medium may manifest the diffraction elements thereof either as an index-of-refraction pattern, a surface relief pattern, or some combination of these two. Thus, the diffracting medium employed by this invention is a diffracting phase medium, rather than a diffracting amplitude medium. While the principles of the present invention apply with equal force to any of the different types of diffracting phase mediums described above, a surface relief pattern transmissive diffracting medium is to be preferred, because it may be made compatible with existing projectors for color transparencies employing color dyes. Further, a surface relief pattern transmission diffraction element lends itself to relatively inexpensive replication by hot pressing in plastic. Any transmissive diffracting medium preferably should be composed of clear, transparent material having a relatively high index of refraction compared to the ambient (such as plastic, bleached emulsion or glass) in order to substantially eliminate any absorption of illuminating light energy within the diffracting medium.

These and other features and advantages of the present invention will become apparent from the following detailed description taken together with the accompanying drawing, in which.

Figure 8:
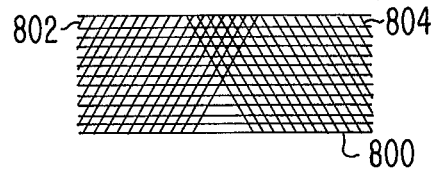
Figure 10:
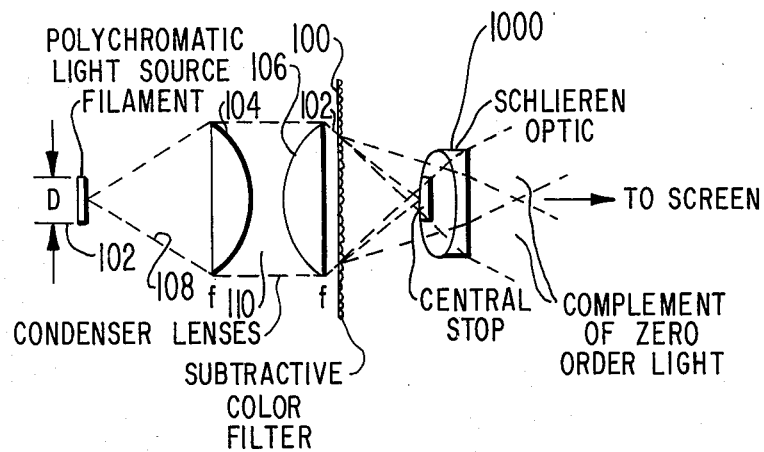
Figure 9:
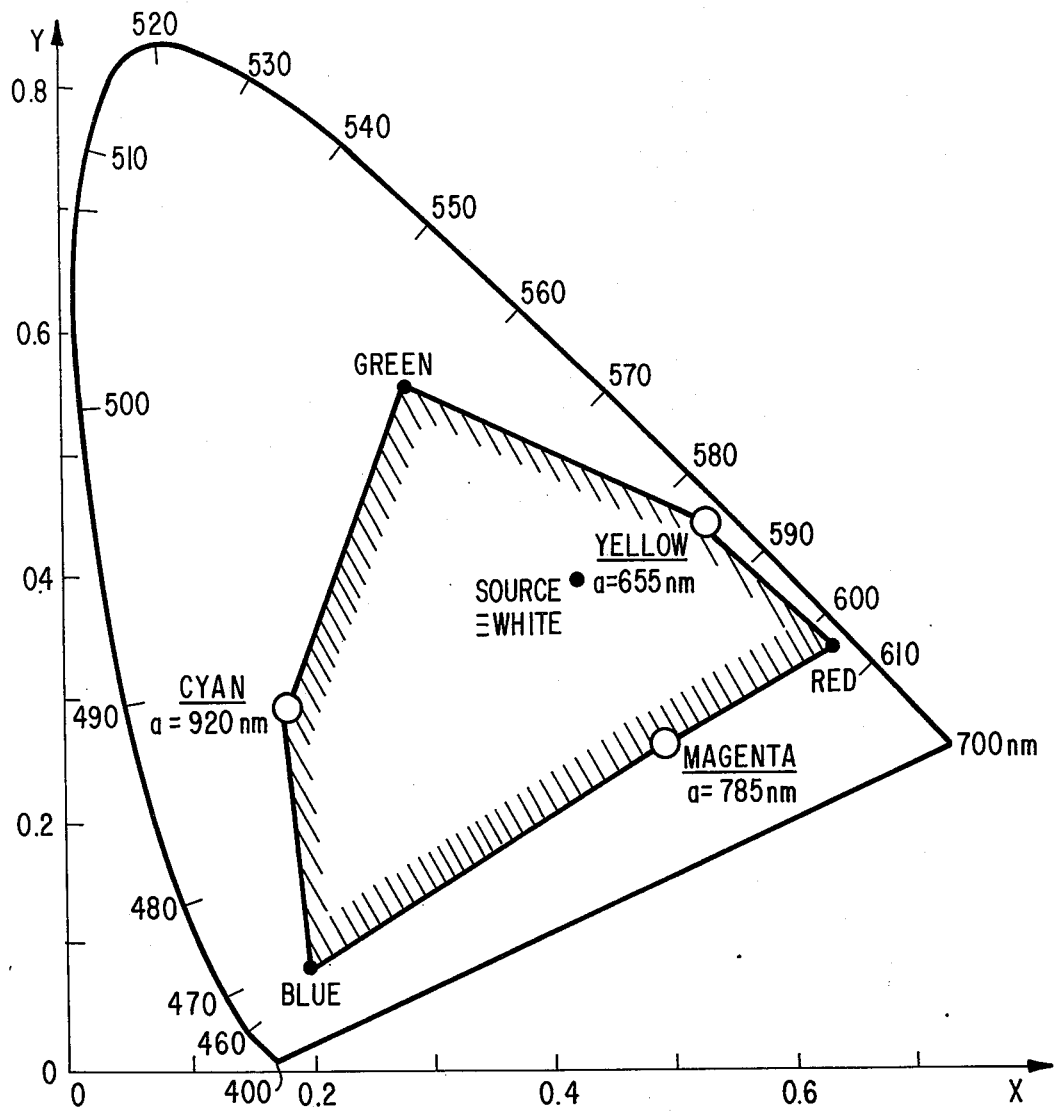

FIG. 8 schematically shows three superimposed, angularly-displaced diffraction gratings;

FIG. 9 is a CIE chart showing the colorimetric capabilities of the zero diffraction order output light of three superimposed square-wave profile gratings which are illuminated with broadband white light; and FIG. 10 is a schematic showing of a projector which employs Schlieren optic means for projecting the aggregate of substantially all diffraction orders other than the zero order.

Figure 1:
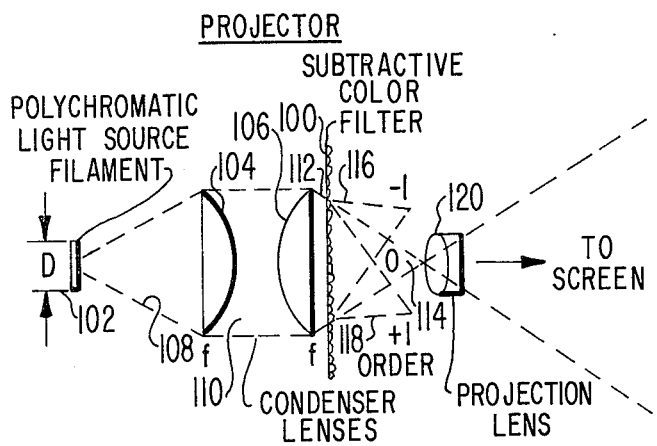
FIG. 1 is a schematic showing of a projector for projecting the zero diffraction order of a surface relief pattern transmissive diffracting medium.

Referring now to FIG. 1, there is shown schematically a typical example of a projector for projecting solely the zero order diffraction of subtractive color filter 100 on a screen. More specifically, subtractive color filter 100 preferably comprises a transparent sheet of material, such as embossed plastic, having a substantially uniform predetermined index of diffraction different from that of the surrounding ambient, such as air. This sheet of material includes a surface relief pattern of spatially distributed diffraction elements. Each diffraction element has a predetermined waveform profile and has a given optical peak amplitude.

subtractive color filter 100 is illuminated with polychromatic light from a source which preferably comprises an incandescent filament 102 emitting broadband white light. The width (i.e. diameter or largest cross sectional dimension) of filament 102 is D, as shown in FIG. 1.

A pair of condenser lenses 104 and 106, each having a focal length f, are situated as shown in FIG. 1 with filament 102 located in the front focal plane of condenser lens 104. Therefore, the diverging light beam 108 is collimated into parallel light beam 110 by condenser lens 104. Condenser lens 106 converts parallel light beam 110 into converging light beam 112.

Figure 1A:
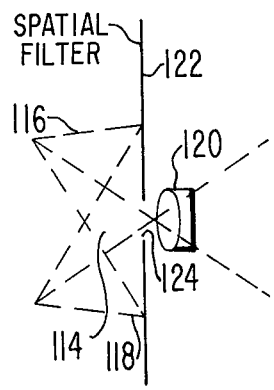
FIG. 1a is a modification of FIG. 1 employing a spatial filter.

Subtractive color filter 100, which is situated as shown in relatively close proximity to condenser lens 106 and in the path of converging light beam 112, is illuminated by converging light beam 112. The light output from subtractive color filter 100 consists of the zero diffraction order 114 and the higher diffraction orders, such as −1 order 116 and +1 order 118. Projection lens 120, which is situated solely in the path of zero diffraction order 114, is effective in projecting solely zero diffraction order output light 114 on a screen. Selective projection is accomplished by the deflection of all the higher diffraction order output light, such as −1 and +1 order output light 116 and 118 beyond the aperture of projection lens 120, as shown in FIG. 1 and/or employing opaque spatial filter 122 in front of projection lens 120, as shown in FIG. 1a. Spatial filter 122 has an opening 124 of limited size therein to permit solely zero diffraction order 114 to pass therethrough, so that all the higher diffraction orders are blocked.

The projector schematically shown in FIG. 1 is compatible with conventional subtractive color filter projectors, such as slide projectors and motion picture projectors. However, it is not intended that the zero-order output light projector necessarily be limited to such a conventional projector or that the subtractive color filter necessarily be in the form of a surface relief pattern on a transparent sheet. In general, the subtractive color filter of the present invention may be any type of diffracting medium which includes a pattern of spatially distributed diffraction elements, wherein each diffraction element has its own predetermined waveform profile and has its own given optical peak amplitude. All that is required for the projector is that at least it have a source of polychromatic light of a given wavelength spectrum for illuminating such a subtractive color filter comprising such a diffracting medium with the polychromatic light therefrom.

It is known in the art that the illumination with monochromatic light of a given wavelength of a diffracting medium comprising a one-half wavelength phase delay diffracting structure, such as a symmetric squarewave diffraction grating having an optical peak amplitude equal to one-half wavelength of the illuminating monochromatic light, results in a null of the zero diffraction order of light. The present invention is concerned with color subtractive filtering effect of illuminating such a diffracting medium (or other types of diffracting mediums including other types of patterns of spatially distributed diffraction elements) with polychromatic light, rather than with monochromatic light.

Figure 2:
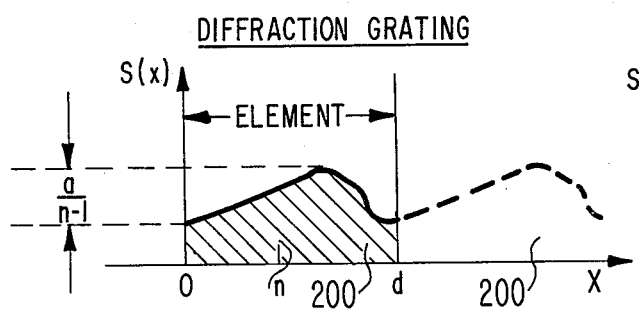
FIG. 2 is a showing of the periodic diffraction elements of a diffraction grating wherein each diffraction element has a generalized waveform profile and a certain optical peak amplitude.

Consider, for instance, the periodic diffraction elements of the diffraction grating shown in FIG. 2. The diffraction grating shown in FIG. 2 is assumed to be manifested as a surface relief pattern in a material having an index of refraction $n$. It is assumed that the diffraction grating is situated within an ambient, such as air, having an index of refraction substantially equal to unity. The diffraction grating is composed of periodic diffraction elements 200 which occur at a diffraction line spacing of $d$. Each of diffraction elements 200 is assumed to have a generalized physical waveform profile $S(X)$. The optical peak amplitude of each diffraction grating is assumed to be $a$. Under the assumed conditions, the physical peak amplitude of the waveform profile of each surface relief pattern diffraction element, shown in FIG. 2, is $a/n - 1$. (If the ambient surrounding the diffraction grating had an index of refraction $n_1$ other than unity, the physical peak amplitude would be $a/n - n_1$.)

The relative amplitude of light diffracted into any diffraction order by the diffraction grating shown in FIG. 2 depends on the number $m$ of the order, the wavelength $\lambda$ of the illuminating light, the line spacing $d$, the difference between the indices of refraction of the diffraction grating ($n$) and its surrounding ambient (1 in the case of air) and the waveform profile $S(X)$ of each diffraction element. In particular, the relative amplitude $A_m$ (when the amplitude of the incident light has been normalized to one) of the $m^{th}$ order is given by equation (1), as follows:

$$A_m = \frac{1}{d}\int_0^d e^{i\frac{2\pi}{\lambda}(n-1)s(x)} \cdot e^{i\frac{2\pi x}{d}m} dx \qquad (1)$$

The diffraction efficiency $I_m$ in terms of intensity (energy) is then:

$$I_m = |A_m|^2 \qquad (2)$$

Equation (1) reduces to equation (3) for the output light in the zero diffraction order, which goes straight through the grating. Thus, $A_0$ is $$A_0 = \frac{1}{d}\int_0^d e^{i\frac{2\pi}{\lambda}(n-1)s(x)} dx \qquad (3)$$

Sinusoidal and symmetric square-wave are two common forms of diffraction grating waveform profiles. In the case of a sinusoidal profile, where $$(n-1)s(x) = \frac{a}{2}\cos\frac{2\pi x}{d},$$

equation (3) becomes:

$$A_0 = J_0(\pi a/\lambda) \qquad (4)$$

where $J_0$ is the zero order Bessel function.

Similarly, if one applies equation (3) to a symmetric square-wave profile, where $(n-1)s(x) =$
$\begin{cases} -a/2 & \text{if } 0<X<d/2 \\ +a/2 & \text{if } d/2<X<d \end{cases}$
expression (5) is derived.

$$A_0 = \cos(\pi a/\lambda) \qquad (5)$$

It will be noted that in both expressions (4) and (5) the amplitude of the zero-diffraction order output light $A_0$ is a function of the ratio of the optical peak amplitude $a$ to wavelength $\lambda$ of the illuminating light, while the particular function itself depends upon the particular waveform profile.

By substituting each of respective expressions (4) and (5) in equation (2), the manner in which the intensity $I_0$ of the zero diffraction order output light varies as a function of $$\frac{2\pi a}{\lambda}$$

can be respectively plotted for both a sinusoidal profile and a symmetric square-wave profile of each diffraction element. Such a plot is shown in FIG. 3.

Figure 3:
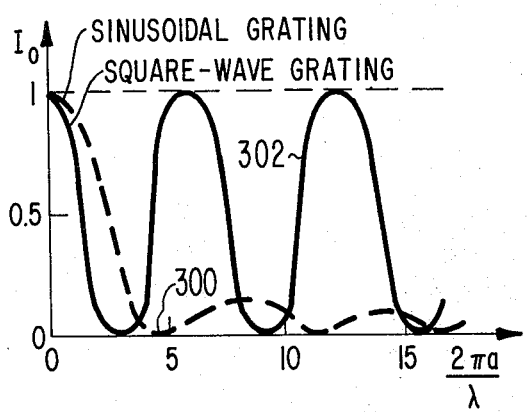
FIG. 3 is a graph showing the relative zero diffraction order light efficiency of diffraction gratings having respectively sinusoidal and symmetrical squarewave waveform profiles as a function of the ratio of optical peak amplitude of a grating to light wavelength.

As shown in FIG. 3, the plot of each of these two different waveform profiles shows a whole series of maxima and minima. However, while the maxima of each successive cycle of the sinusoidal profile 300 grows smaller as $$\frac{2\pi a}{\lambda}$$

(the phase change) grows larger, this is not the case with the symmetric square-wave profile. Instead, the plot of the symmetric square-wave profile 302 in FIG. 3 shows that the zero-order transmission periodically declines to zero percent and then rises again to 100 percent. For any fixed value of $a$, the optical peak amplitude, these variations represent a wavelength dependence of the transmission. It is this wavelength dependence which, in accordance with the principles of the present invention, enables a diffracting medium to be employed as a subtractive color filter.

While gratings having a sinusoidal or symmetric square-wave profile exhibit at least some wavelength selectivity, it is apparent from FIG. 3 that the wavelength selectivity of a symmetric square-wave grating of predetermined optical peak amplitude $a$ is greater than that of a corresponding sinusoidal profile. Thus, a square-wave profile is ordinarily preferable in a color subtractive filter to other predetermined waveform profiles for producing good color, due to its greater wavelength selectivity. However, in special cases, it might be desirable to use some other predetermined waveform profile than a square-wave profile, despite the lower wavelength selectivity of such other predetermined waveform profile. Therefore, the present invention is not limited to a square-wave profile.

Figure 4:
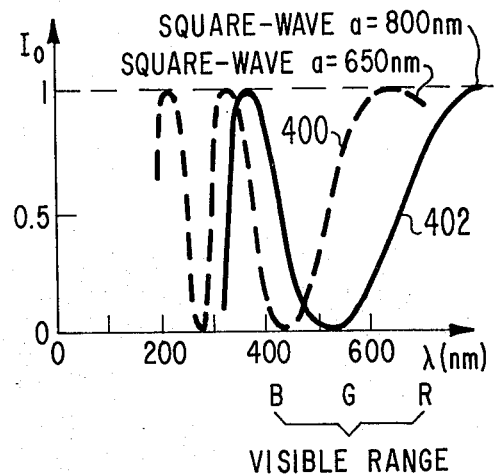
FIG. 4 is a graph showing the relative zero diffraction order optical efficiency of two symmetrical square-wave profile diffraction gratings having respectively two different specific optical peak amplitudes as a function of light wavelength.

FIG. 4 shows a plot of the relative intensity of the zero diffraction order as a function of wavelength for a first diffraction grating 400 having a symmetriic square-wave profile and an optical peak amplitude of 650 nanometers and a second diffraction grating 402 having a symmetric square-wave profile and an optical peak amplitude of 800 nanometers. It should be noted that the wavelength dependency of the zero order transmission of the two symmetric square-wave gratings 400 and 402 are quite different from each other over the visible range (400–700 nanometers) of the spectrum. It is this fact which is employed in the design of a particular subtractive color filter from a diffracting medium, in accordance with the principles of the present invention.

As known in the art of colorimetry, standard colorimetric data, consisting of the trichromatic coefficients of "The Standard Observer", can be employed to define both color and luminous efficiency, with respect to a standard white light source. If, by way of example, a standard white light source having an effective radiant temperature $T = 3200°$ Kelvin is employed to illuminate a symmetric square-waveform diffraction grating, the color and luminous efficiency of the zero diffraction order output light is uniquely determined by the specific value of the optical peak amplitude $a$ of the symmetric square-wave diffraction grating.

The following table I lists the color and luminous efficiency of each of a plurality of symmetric square-wave gratings having different given optical peak amplitudes $a$. The values shown in Table I were calculated employing transmission curve plots similar to those shown in FIG. 4 using the standard colorimetric data of "The Standard Observer". Such standard colorimetric data is available in the *Handbook of Chemistry and Physics*, 46th edition 1965–66, page E-166.

TABLE I

| amplitude a (nm) | color | luminous eff. (%) light source T-3200 K |
|---|---|---|
| 250 | dark brown | 4.3 |
| 265 | dark magenta | 2.6 |
| 300 | blue | 2.3 |
| 500 | greenish white | 84.1 |
| 700 | yellow | 54.3 |
| 800 | magenta | 15.6 |
| 900 | cyan | 16.8 |
| 1050 | yellowish green | 70.4 |

It will be noted from Table I that a symmetric square-wave grating having an optical peak amplitude $a$ of 800 nanometers, in response to being illuminated by white light from a source having an effective radiant temperature of 3200° Kelvin, yields zero order diffraction light which is magenta in color. Such a symmetric square-wave grating 402, having an optical peak amplitude of 800 nanometers, is one of the two plots in FIG. 4. It can be seen from the plot of the 800 nanometers optical peak amplitude square-wave grating 402 in FIG. 4 that a relatively large proportion of the illuminating light is transmitted in both the blue and red end regions of the visible range of the spectrum, but that relatively little light is transmitted in the middle (in the vicinity of green) region of the visible range of the spectrum. This subtractive color filtering action, exhibited by FIG. 4, is the reason that the transmitted zero order output light appears as magenta (a mixture of red and blue) in color. Since, as indicated by FIG. 4, the distribution of a symmetric square-wave transmission curve in the visible range of the light spectrum is uniquely determined by the optical peak amplitude $a$ of the symmetric square-wave diffraction grating, by appropriately choosing this optical peak amplitude $a$, the color manifested by the zero diffraction order output light may be selected to be any of the colors listed in Table I.

Figure 5:
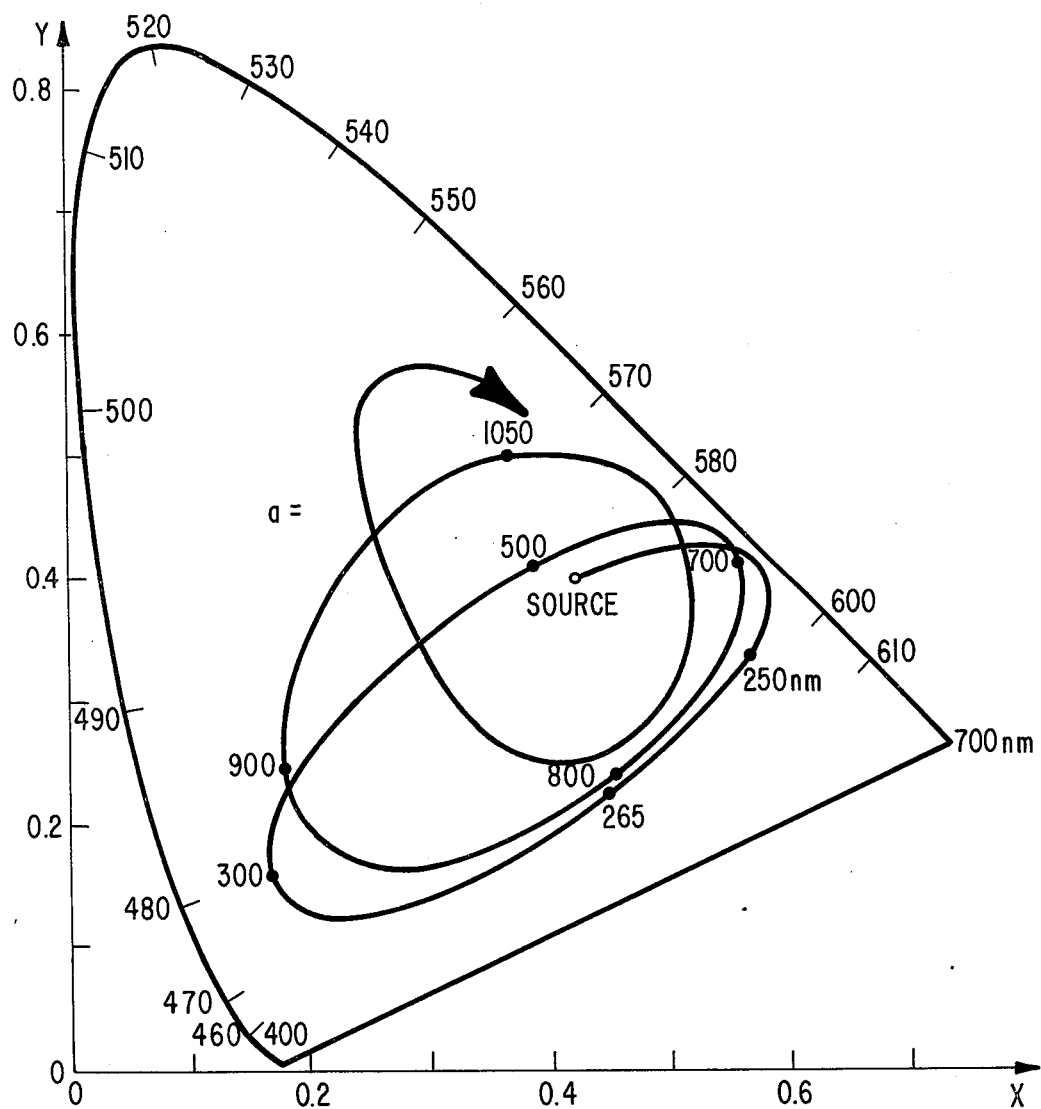
FIG. 5 is a CIE chart showing the colorimetric parameters of zero order diffraction output light obtained from a symmetric square-wave diffraction grating illuminated with broad-band white light as a function of the optical peak amplitude of this symmetric square waveform profile diffraction grating.

FIG. 5 shows the eight respective examples of optical peak amplitude $a$ shown in Table I plotted on the CIE color chart. As known in the art of colorimetry, every point on the CIE color chart uniquely corresponds to a certain color hue at a certain saturation. As indicated in the CIE color chart of FIG. 5, all of the eight respective points shown therein, corresponding to the respective eight optical peak amplitudes $a$ shown in Table I, lie on a spiraling line. Every point on this spiraling line, shown on the CIE color chart of FIG. 5, corresponds to a diffraction grating having a symmetric square-wave profile, the only variable being the optical peak amplitude $a$ of the symmetric square-wave profile diffraction grating corresponding to that point. However, the present invention is not limited to gratings having symmetric square-wave profiles. If a diffraction grating has some predetermined waveform profile other than a symmetric square-wave profile and a plot is made on a CIE color chart of this other predetermined waveform profile as a function of the optical peak amplitude $a$ thereof, the plot will lie on some other unique line than the spiraling line corresponding to a symmetric square-wave profile.

Figure 6:
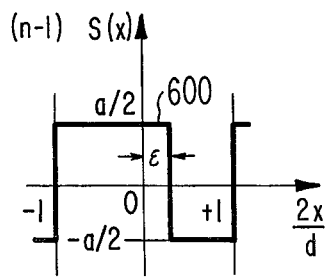
FIG. 6 is a graph of an asymmetric square-wave waveform profile.

A grating profile which is of particular interest in providing subtractive color filters is an asymmetric square-wave profile, such as shown in FIG. 6, rather than a symmetric square-wave profile. As indicated in FIG. 6, an asymmetric square-wave profile 600 is similar to a symmetric square-wave profile in all respects except that the value of the asymmetric parameter $\epsilon$ has a value other than zero (i.e. a symmetric square-wave has a duty cycle of exactly 50 percent while an asymmetric square-wave has some certain duty cycle other than 50 percent). It is apparent that, all other things being equal, a maximum of the illuminating light is diffracted into diffraction orders higher than the zero diffraction order for the symmetric square wave case, where $\epsilon = 0$ (50 percent duty cycle), while in the limiting asymmetric cases, where $\epsilon = -1$ or $+1$ (zero percent or 100 percent duty cycle), none of the illuminating light at all is diffracted into diffraction orders higher than the zero diffraction order. This is true because, in these limiting cases, the diffraction elements of the surface relief pattern disappear altogether. Therefore, all the illuminating light, in these limiting cases, passes straight through, without diffraction, through the normally diffracting medium and emerges as zero diffraction order output light.

Figure 7:
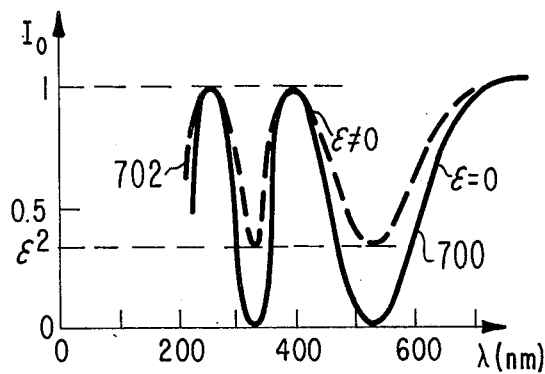
FIG. 7 is a graph showing the effect on zero diffraction order optical efficiency of asymmetry in the square-wave waveform profile as a function of wavelength.

In general, the effect of asymmetry of the square-wave profile on the intensity of the zero-order diffraction light is indicated in FIG. 7. FIG. 7 shows a first plot 700, similar to the one shown in FIG. 4, for the relative intensity of the zero order diffraction output light as a function of wavelength for a symmetric square wave ($\epsilon = 0$) having some predetermined optical peak amplitude. FIG. 7 also shows a second plot 702 for an asymmetric square-wave profile ($\epsilon$ has some certain value other than zero) which corresponds with the first plot in all other respects. As can be seen from FIG. 7, both the first plot, 700 and the second plot 702 have coincident transmission maximum at $I_0$ equal to one. However, while the minima of the first plot 700, where $\epsilon = 0$, occurs at $I_0 = 0$, the minima of the second plot 702, where $\epsilon$ has a certain value other than zero occurs at $I_0 = \epsilon^2$. This shows that all other things being equal, the saturation of the color hue manifested by the zero diffraction order decreases as the asymmetry of the square-wave increases (i.e. by the amount that the duty cycle varies from 50 percent).

Considering the asymmetrical square-wave grating 600 shown in FIG. 6 more quantitatively, the intensity diffraction efficiency $I_0$ of the zero diffraction order for an asymmetrical square-wave grating, obtained by evaluating the equations (1) and (2) for an asymmetrical square wave grating, becomes:

$$I_0 = (1-\epsilon^2) \cos^2(\pi a/\lambda) + \epsilon^2 \qquad (6)$$

Thus, the effect of $\epsilon$ having a value other than zero on the wavelength dependence of $I_0$ is that a constant term $\epsilon^2$, corresponding to white light, is added. Consequently, the chromaticity of the transmitted light remains constant, but the saturation changes.

So far discussed, a subtractive color filter made in accordance with the principles of the prsent invention comprise a single diffraction grating. This need not be the case. The subtractive color filter may be comprised of two or more superimposed gratings. In the case of color pictures, the tri-stimulous color sensitivity of the eye makes it desirable to employ three superimposed gratings, each of the three superimposed gratings having an optical peak amplitude corresponding to a separate one of three primary colors. FIG. 8 shows an arrangement of three superimposed gratings 800, 802 and 804. As shown in FIG. 8, gratings 800, 802 and 804 all have the same line spacing, but are angularly displaced from each other. This angular displacement, which may be 60°, prevents the generation of unwanted spatial beat frequencies. These unwanted spatial beat frequencies can also be avoided by employing diffraction gratings of different line spacings from each other, rather than angularly displacing the diffraction gratings with respect to each other as shown in FIG. 8. Of course, both angular displacement and different line spacings for the plurality of gratings may both be employed to avoid spatial beat frequencies.

In more quantitative terms, if a plurality of phase-gratings are superimposed, the resulting zero-order diffraction efficiency is given by the product of the zero-order diffraction efficiency of each of the superimposed gratings. In particular, if three-phase-gratings are superimposed, and each one has a zero-order diffraction efficiency of $I_C(\lambda)$, $I_M(\lambda)$ and $I_Y(\lambda)$, respectively, the resulting zero-order diffraction efficiency is given by the product $I_0(\lambda)$, as indicated in equation (7).

$$I_0(\lambda) = I_C(\lambda) \cdot I_M(\lambda) \cdot I_Y(\lambda) \qquad (7)$$

Equation (7) holds for "independent" diffraction gratings, i.e. the gratings must have different grating line spacings and/or angular orientations, as discussed above, to avoid generation of spatial beat frequencies. Specifically, if this is not the case, intermodulation effects lead to additional terms in equation (7) which include unwanted spatial beat frequencies. (Equation (7) could also be applied to conventional color film where $I_C$, $I_M$ and $I_Y$ would represent the optical transmission curves for the three layered dyes.)

By way of example, the respective optical peak amplitudes of gratings 800, 802 and 804 may be selected to correspond with a set of primary colors composed of cyan (minus red), magenta (minus green) and yellow (minus blue). It can be calculated that for a square-wave grating cyan corresponds to an optical peak amplitude $a_C = 920$ nanometers, magenta corresponds to an optical peak amplitude $a_M = 785$ nanometers and yellow corresponds to an optical peak amplitude $a_Y = 655$ nanometers. If the three gratings 800, 802 and 804, in FIG. 8, are assumed to be rotated mutually by 60° with respect to each other, then the optical peak amplitude $a_C$, $a_M$ and $a_Y$ can be kept constant, but the corresponding asymmetric parameters $\epsilon_C$, $\epsilon_M$ and $\epsilon_Y$ can be independently controlled. If this is done, the color gamut listed in Table 2 is obtained:

TABLE 2

| | $\epsilon_C$ | $\epsilon_M$ | $\epsilon_Y$ | luminous efficiency |
|---|---|---|---|---|
| white | 1 | 1 | 1 | 100.0% |
| yellow | 1 | 1 | 0 | 74.5% |
| magenta | 1 | 0 | 1 | 19.5% |
| cyan | 0 | 1 | 1 | 22.2% |
| blue | 0 | 0 | 1 | 1.8% |
| green | 0 | 1 | 0 | 11.9% |
| red | 1 | 0 | 0 | 17.2% |
| black | 0 | 0 | 0 | 2.8% |

The total color range obtainable employing the cyan, magenta and yellow color primaries shown in Table 2 is plotted in the CIE color chart of FIG. 9. Any color within the hexagon in FIG. 9 can be obtained by suitable choice of $\epsilon_C$, $\epsilon_M$, and $\epsilon_Y$. The brightness of the color is adjusted by changing all three of these symmetry parameters together by the same amount in the same direction. The range of colors corresponds to that obtainable with conventional color film (which is somewhat smaller than that obtainable with color television).

For reliable operation, it is important that the amplitude of each grating remain constant within a tolerance of a few percent and that the edges of the square-wave profiles are relatively sharp i.e. having a slope of about ten percent or less. Only the respective values of the three asymmetry parameters $\epsilon_C$, $\epsilon_M$ and $\epsilon_Y$ should change from place to place in the spatially-distributed pattern of diffraction elements according to picture chrominance and luminance information.

Although in the previous discussion it has been assumed that the color subtractive filter is made up of either one diffraction grating or a plurality of superimposed diffraction gratings, it is not essential that the spatially-distributed diffraction elements of the diffracting medium comprising the subtractive color filter be composed of diffraction gratings. For example, other types of step-function waveform profiles can be substituted for square-wave gratings to provide one or a plurality of superimposed periodic "binary" phase delay structures fine enough to separate the diffracted light into zero diffraction order light and light of higher diffraction orders. For example, a regular array of dots of well defined thickness can be substituted for an asymmetric square-wave grating. This corresponds to structures commonly used in printing. A relation to the grating formulas, discussed above, is established by the condition that the ratio of the areas of the two thickness levels should be the same as for the asymmetric square wave grating. That is, $$\frac{\text{area with optical path} + \frac{a}{2}}{\text{area with optical path} - \frac{a}{2}} = \frac{1+\epsilon}{1-\epsilon} \qquad (8)$$

A dotted structure can be obtained by varying the dot size, as is done in printing by screening. However, the specific choice of the diffractive structure is immaterial as far as the present invention is concerned.

Returning now to FIG. 1, the fact that polychromatic light source filament 102 has a finite width D, means that the condenser lenses 104 and 106, each having a focal length f, project the filament into the principal plane of projection lens 120 with a light spread D corresponding to the diameter of the projection lens 120. In order to assure that both $-1$ diffraction order output light 116 and $+1$ diffraction order output light 118 are well outside the aperture of projection lens 120 and do not overlap the zero diffraction order output light 114, the minimum diffraction angle of the first order diffracted light must exceed the spread of light due to the filament width. As is known, the sine of the minimum angle of diffraction between the zero and first orders is equal to $\lambda/d$ (where $d$ is the spatial period of the diffracting elements shown in FIG. 2 and $\lambda$ is the minimum light wavelength) i.e. blue light wavelength. It is also known that the sine of the angle of the spread of width due to the filament light D is equal to $D/f$. Since it is essential that the higher diffraction orders be deflected sufficiently to prevent any overlap of the zero diffraction order and any of the higher diffraction orders in the aperture of projection lens 120, the angle of first order diffracted light must exceed the spread of light due to filament width. This is fulfilled whenever $$\lambda/d > D/f \text{ or } d < \frac{\lambda f}{D} \qquad (9)$$

Since a wavelength of 0.4 nanometers, corresponding to blue light, is the shortest wavelength in the visible range, $\lambda$ should have a value of 0.4 nanometers in formula (9). Typical values in commercial projectors such as employed as microfiche readers, are $f = 40$ millimeters and $D = 6$ millimeters. If $\lambda = 0.4$ nanometers, according to formula (9) the spatial period $d$ of a deflection element must have a value no greater than 2.7 micrometers in such commercial projectors, is overlapping of the zero diffraction order with the first diffraction order is to be avoided. Formula (9) is the only restriction on the maximum value of d, since d does not appear in any of the expressions for $A_0$, which affect color. Thus, $d$ only affects the resolution capabilities of subtractive color filter 100 and the collimation restrictions in the read-out optics.

The projector shown in FIG. 1 employs solely the zero diffraction order as the useful output light from subtractive color filter 100. It is plain that for a non-absorbing diffractive structure the aggregate of all diffraction order output light other than the zero diffraction order output light corresponds to the complement (negative) of the zero diffraction order output light, since the sum of the zero order diffraction output light and all the higher diffraction order output light is always equal to the incident illuminating polychromatic light (less any absorption and reflection by the filter which is normally negligible). FIG. 10 shows a modification of projector shown in FIG. 1, which is capable of projecting the output light from all (or at least substantially all) the diffraction orders other than the zero diffraction order. As shown in FIG. 10, this is accomplished by replacing projection lens 120 of FIG. 1 by Schlieren optic 1000. As known in the art, a Schlieren optic is effective in projecting the aggregate of all (or substantially all) diffraction orders other than the zero diffraction orders. Similarly, one might think of collecting light within a suitable spherical angle behind the subtractive color filter originating from different higher orders. Due to the angular dispersion of white light, the resulting color depend then not only on the shape of the diffraction element but also on their spacings d.

Subtractive color filters embodying the principles of the present invention may be physically prepared in various ways known in the art. By way of example, one simple way of preparing a symmetric square-wave grating manifesting a predetermined color hue is to coat a thin glass substrate, similar to a microscope slide, with a layer of positive photoresist having a predetermined thickness. This predetermined thickness is calculated to have a value such that, after exposure to light and development thereof to remove all the photoresist from the glass substrate from solely those areas which have been exposed to light, the depth of the developed unexposed photoresist has a value which just corresponds to the optical peak amplitude associated with a preselected color hue. If the exposure of the photoresist is made by the contact printing of a chrome-on-glass diffraction grating, the developed photoresist exhibits a symmetric square-wave profile diffraction grating having an optical peak amplitude determined solely by the thickness of the developed unexposed photoresist. In this manner, a desired zero diffraction order color transfer function of a subtractive color filter is realized.

Further, similar techniques using a color-separation negative of a given color scene, may be applied to produce a square-wave grating in photoresist in which the color represented by the color-separation negative is the same as that manifested by the optical peak amplitude of the photoresist grating and the brightness of the negative corresponds to a variation of the duty cycle. By making three such photoresist gratings, each having an optical peak amplitude corresponding to a different primary color, and placing the three gratings in serial relationship with each other (providing appropriate angular displacement with respect to each other as discussed above), a subtractive color filter manifesting a color picture of the color scene is derived.

Other means of recording spatially distributed diffraction elements on a photoresist can be employed, such as a pulse-width modulated electron beam recorder, to provide spatially distributed diffracting elements in which the value of the asymmetry parameter $\epsilon$ is controlled to provide a gray scale in the color scene or otherwise control the saturation of the subtractive color filter.

It is not intended that the present invention be implemented only by the methods suggested above, by way of example, since it is believed that other methods for implementing the principles of the present invention are within the skill of the art.

What is claimed is:

1. A subtractive color filter for use in filtering polychromatic light having a given wavelength spectrum illuminating said color filter, said color filter comprising a diffracting phase-medium including a pattern of spatially distributed diffraction elements, each diffraction element having its own predetermined waveform profile and having its own given optical peak amplitude, whereby the fraction of input light of any spectral wavelength component within said given wavelength spectrum illuminating any diffraction element of said color filter which is transferred into the zero diffraction order of output light from said color filter varies as a function of spectral wavelength in accordance with the predetermined waveform profile and given optical peak amplitude of that diffraction element, said predetermined waveform profile and given optical peak amplitude of each diffraction element of said pattern being preselected in accordance with said given wavelength spectrum of said polychromatic illuminating light to provide said subtractive color filter with a certain color-filter zero-order output light transfer function.

2. The subtractive color filter defined in claim 1, wherein said diffracting medium comprises a transparent sheet of material having a substantially uniform predetermined index of refraction different from that of the surrounding ambient, said sheet including a surface relief pattern of said spatially distributed diffraction elements.

3. The subtractive color filter defined in claim 1, wherein the waveform profile of each of said diffraction elements is a step function.

4. The subtractive color filter defined in claim 3, wherein said diffracting medium comprises a transparent sheet of material having a substantially uniform predetermined index of refraction different from that of the surrounding ambient, said sheet including a surface relief pattern of said spatially distributed diffraction elements, and wherein said surface relief pattern includes at least one periodic binary step function phase delay structure, all of said periods of said one periodic binary step function phase delay structure having substantially the same preselected amplitude, said one phase delay structure corresponding to a given color hue determined solely by said preselected amplitude.

5. The subtractive color filter defined in claim 4, wherein the duty cycle of each respective period of said one periodic phase delay structure varies in accordance with the amount of saturation of said given color hue manifested by that respective period.

6. The subtractive color filter defined in claim 4, wherein said one phase delay structure is a square-wave diffraction grating with each groove thereof corresponding to a respective period of said binary step function.

7. The subtractive color filter defined in claim 6, wherein said square-wave is an asymmetric square wave with the duty cycle of each period thereof varying in accordance with the amount of saturation of said given color hue manifested by that period.

8. The subtractive color filter defined in claim 4, wherein said surface relief pattern includes a plurality of superimposed periodic binary step function phase delay structures, all of said periods of each respective periodic binary step function phase delay structure having substantially the same individual preselected amplitude which is different from the individual preselected amplitude of any other of said plurality of superimposed periodic binary step function phase delay structures, each of said respective phase delay structures corresponding to a different given color hue determined by the individual preselected amplitude thereof.

9. The subtractive color filter defined in claim 8, wherein the duty cycle of each respectiive period of each of said respective phase delay structures varies in accordance with the amount of saturation of the given color hue manifested by that respective period.

10. The subtractive color filter defined in claim 8, wherein the number of said respective phase delay structures is three, and the individual preselected amplitude of each of said three phase delay structures corresponds to a different primary color hue.

11. The subtractive color filter defined in claim 10, wherein the duty cycle of each respective period of each of said three phase delay structures varies in accordance with the amount of saturation of the respective primary color hue manifested by that respective period.

12. The subtractive color filter defined in claim 8, wherein each respective superimposed phase delay structure is a square-wave diffraction grating with each groove thereof corresponding to a respectiive period of the binary step function of that respective phase delay structure, each respective square-wave diffraction grating having an angular orientation and a period at least one of which is different from that of any other respective square-wave diffraction grating.

13. The subtractive color filter defined in claim 12, wherein said square-wave of each of said respective diffraction gratings is an asymmetric square wave with the duty cycle of each period thereof varying in accordance with the amount of saturation of said given color hue manifested by that period of that respective diffraction grating.

14. The subtractive color filter defined in claim 12, wherein the number of said respective diffraction gratings is three and the individual preselected amplitude of each of said three diffraction gratings corresponds to a different primary color hue.

15. The subtractive color filter defined in claim 14, wherein the square wave of each of said three diffraction gratings is an asymmetric square wave with the duty cycle of each period thereof varying in accordance with the amount of saturation of the primary color hue manifested by that period of that one of said three diffraction gratings.

16. In combination:
   a. a subtractive color filter comprising a diffracting phase medium including a pattern of spatially distributed diffraction elements, each diffraction element having its own predetermined waveform profile and having its own given optical peak amplitude, whereby the fraction of input light of any spectral wavelength component within a given wavelength spectrum illuminating any diffraction element of said color filter which is transferred into the zero diffraction order of output light from said color filter varies as a function of spectral wavelength in accordance with the predetermined waveform profile and given optical peak amplitude of that diffraction element, said predetermined waveform profile and given optical peak amplitude of each diffraction element of said pattern being preselected to provide said subtractive color filter with a certain color-filter zero-order output light transfer function when illuminated with polychromatic light having a given wavelength spectrum, and
   b. a source of polychromatic light having said given wavelength spectrum for illuminating said subtractive color filter with said polychromatic light therefrom.

17. The combination defined in claim 16, wherein said source of polychromatic light includes a filament having a width D and condensing lens means having a focal length of $f$, wherein the lowest wavelength in said given wavelength spectrum is $\lambda$, and wherein the maximum size $d$ of any of said diffraction elements is such that $$d < \frac{\lambda f}{D}.$$

18. The combination defined in claim 17, wherein $d < 2.7$ in micrometers.

19. The combination defined in claim 16, further including a projection lens having a given aperture positioned to project solely said zero diffraction order output light.

20. The combination defined in claim 19, further including a spatial filter situated between said diffracting medium and said projection lens for intercepting substantially all diffraction orders of output light from said diffracting medium other than said zero order and permit only said zero order to reach said projection lens.

21. The combination defined in claim 16, further including Schlieren optic means positioned to block solely said zero diffraction order output light and to project the aggregate of substantially all diffraction orders of output light from said diffraction medium other than said zero order, whereby said projected light corresponds to the complement of said zero-order output light transfer function of said subtractive color filter.

22. The combination defined in claim 16, wherein the waveform profile of each of said diffraction elements is a step function, and wherein said diffracting medium comprises a transparent sheet of material having a substantially uniform predetermined index of refraction different from that of the surrounding ambient, said sheet including a surface relief pattern of said spatially distributed diffraction elements, and wherein said surface relief pattern includes at least one periodic binary step function phase delay structure, all of said periods of said one periodic binary step function phase delay structure having substantially the same preselected amplitude, said one phase delay structure corresponding to a given color hue determined solely by said preselected amplitude.

23. The combination defined in claim 22, wherein said source of polychromatic light includes a filament having a width D and condensing lens means having a focal length of $f$, wherein the lowest wavelength in said given wavelength spectrum is $\lambda$, and wherein the maximum size d of any of said diffraction elements is such that $$d < \frac{\lambda f}{D}.$$

24. The combination defined in claim 23, wherein $d < 2.7$ micrometers.

25. The combination defined in claim 22, further including a projection lens having a given aperture positioned to project solely said zero diffraction order output light.

26. The combination defined in claim 25, further including a spatial filter situated between said diffracting medium and said projection lens for intercepting substantially all diffraction orders of output light from said diffracting medium other than said zero order and permit only said zero order to reach said projection lens.

27. The combination defined in claim 22, further including Schlieren optic means positioned to block solely said zero diffraction order output light and to project the aggregate of substantially all diffraction orders of output light from said diffraction medium other than said zero order, whereby said projected light corresponds to the complement of said zero-order output light transfer function of said subtractive color filter.

28. The combination defined in claim 22, wherein the duty cycle of each respective period of said one periodic phase delay structure varies in accordance with the amount of saturation of said given color hue manifested by that respective period.

29. The combination defined in claim 22, wherein said one phase delay structure is a square-wave diffraction grating with each groove thereof corresponding to a respective period of said binary step function.

30. The combination defined in claim 29, wherein said square-wave is an asymmetric square-wave with the duty cycle of each period thereof varying in accordance with the amount of saturation of said given color hue manifested by that period.

31. The combination defined in claim 22, wherein said surface relief pattern includes a plurality of superimposed periodic binary step function phase delay structures, all of said periods of each respective periodic binary step function phase delay structure having substantially the same individual preselected amplitude which is different from the individual preselected amplitude of any other of said plurality of superimposed periodic binary step function phase delay structures, each of said respective phase delay structures corresponding to a different given color hue determined by the individual preselected amplitude thereof.

32. The combination defined in claim 31, wherein the duty cycle of each respective period of each of said respective phase delay structures varies in accordance with the amount of saturation of the given color hue manifested by that respective period.

33. The combination defined in claim 31, wherein the number of said respective phase delay structures is three, and the individual preselected amplitude of each of said three phase delay structures corresponds to a different primary color hue.

34. The combination defined in claim 33, wherein the duty cycle of each respective period of each of said three phase delay structures varies in accordance with the amount of saturation of the respective primary color hue manifested by that respective period.

35. The combination defined in claim 34, wherein said source of polychromatic light includes a filament having a width D and condensing lens means having a focal length of $f$, wherein the lowest wavelength in said given wavelength spectrum is $\lambda$, and wherein the maximum side $d$ of any of said diffraction elements is such that $$d < \frac{\lambda f}{D}.$$

36. The combination defined in claim 35, wherein $d < 2.7$ in micrometers.

37. The combination defined in claim 34, further including a projection lens having a given aperture positioned to project solely said zero diffraction order output light.

38. The combination defined in claim 37, further including a spatial filter situated between said diffracting medium and said projection lens for intercepting substantially all diffraction orders of output light from said diffracting medium other than said zero order and permit only said zero order to reach said projection lens.

39. The combination defined in claim 34, further including Schlieren optic means positioned to block solely said zero diffraction order output light and to project the aggregate of substantially all diffraction orders of output light from said diffraction medium other than said zero order, whereby said projected light corresponds to the complement of said zero-order output light transfer function of said subtractive color filter.

40. The combination defined in claim 31, wherein each respective superimposed phase delay structure is a square-wave diffraction grating with each groove thereof corresponding to a respective period of the binary step function of that respective phase delay structure, each respective square-wave diffraction grating having an angular orientation and a period at least one of which is different from that of any other respective square-wave diffraction grating.

41. The combination defined in claim 40, wherein said square-wave of each of said respective diffraction gratings is an asymmetric square wave with the duty cycle of each period thereof varying in accordance with the amount of saturation of said given color hue manifested by that period of that respective diffraction grating.

42. The combination defined in claim 40, wherein the number of said respective diffraction gratings is three and the individual preselected amplitude of each of said three different gratings corresponds to a different primary color hue.

43. The combination defined in claim 42, wherein the square wave of each of said three diffraction gratings is an asymmetric square wave with the duty cycle of each period thereof varying in accordance with the amount of saturation of the primary color hue manifested by that period of that one of said three diffraction gratings.

44. The combination defined in claim 43, wherein said source of polychromatic light includes a filament having a width D and condensing lens means having a focal length of $f$, wherein the lowest wavelength in said given wavelength spectrum is $\lambda$, and wherein the maximum size $d$ of any of said diffraction elements is such that $$d < \frac{\lambda f}{D}.$$

45. The combination defined in claim 44, wherein $d < 2.7$ in micrometers.

46. The combination defined in claim 43, further including a projection lens having a given aperture positioned to project solely said zero diffraction order output light.

47. The combination defined in claim 46, further including a spatial filter situated between said diffracting medium and said projection lens for intercepting substantially all diffraction orders of output light from said diffracting medium other than said zero order and permit only said zero order to reach said projection lens.

48. The combination defined in claim 43, further including Schlieren optic means positioned to block solely said zero diffraction order output light and to project the aggregate of substantially all diffraction orders of output light from said diffraction medium other than said zero order, whereby said projected light corresponds to the complement of said zero-order output light transfer function of said subtractive color filter.

49. A subtractive color filtering method comprising the step of diffracting through at least a certain angle a portion of applied polychromatic light having a given wavelength spectrum to discriminatingly transfer as a predetermined function of spectral wavelength some certain fraction of each respective spectral wavelength component of said applied light into diffraction orders higher than the zero diffraction order and transfer substantially the entire remainder of said applied light into the zero diffraction order, said certain angle being sufficient to obtain color-filter zero diffraction order output light situated in non-overlapping relationship with any of the color-filter output light of diffraction orders higher than said zero diffraction order, whereby the color-filter zero-diffraction order output light transfer function is substantially the complement of that of the color-filter output light of the aggregate of all the diffraction orders higher than said zero diffraction order.

50. The method defined in claim 49, further including the step of projecting solely said zero diffraction order output light.

51. The method defined in claim 49, further including the step of projecting solely substantially the aggregate of diffraction orders other than said zero order.

52. The method defined in claim 49, wherein said applied light comprises a two-dimensional set of contiguous spatially-distributed applied-light components, and wherein said step of diffracting includes the step of simultaneously diffracting a particular portion of the spectrum of each respectiive applied-light component, the relative amount of each respective particular portion being preselected.

53. The method defined in claim 52, wherein said polychromatic light is broad-band white light, wherein said predetermined function of spectral wavelength is preselected to provide said zero diffraction order output light with a given color hue, and wherein the relative amount of the particular combination of any applied-light component is preselected to provide a given saturation of said given color hue of the zero diffraction order output light derived from that applied-light component.

54. The method defined in claim 53, wherein the relative amount and spectral wavelength dependence of each particular portion varies in accordance with color-picture information.

55. The method defined in claim 49, wherein said step of diffracting comprises the step of simultaneously diffracting said applied light into a plurality of sets of higher orders than said zero diffraction order with a separate predetermined function of spectral wavelength being associated with each respective one or a certain combination of said sets of higher orders than said zero diffraction order.

56. The method defined in claim 55, wherein each of said separate predetermined functions of spectral wavelength corresponds to a different given color hue, whereby the zero diffraction order output light corresponds to a color determined by said respective different given color hues.

57. The method defined in claim 56, wherein said polychromatic light is broad-band white light, and wherein said separate predetermined functions of spectral wavelength are preselected to provide said zero diffraction order output light with a particular distinctive color hue in the CIE color chart.

58. The method defined in claim 55, wherein said applied light comprises a two-dimensional set of contiguous spatially-distributed applied-light components, and wherein said step of simultaneously diffracting includes the step of simultaneously diffracting a particular portion of each respective applied-light component, the relative size of each respective particular portion being preselected.

59. The method defined in claim 58, wherein each of the separate predetermined functions of spectral wavelength corresponds to a different given color hue, and wherein the relative size of the particular portion of any applied-light component is preselected to provide a different given saturation of each of said different given color hues of the higher diffraction order output light derived from that applied-light component, whereby the zero-diffraction order output light derived from that applied-light component corresponds to a particular color hue and saturation determined by said respective different given color hues and said respective different given saturations.

60. The method defined in claim 59, wherein said polychromatic light is broad-band white light and wherein said separate predetermined functions and the relative size of the particular portion of any respective component of said applied light are preselected to provide said zero-diffraction order output light derived from that component of said applied light with a particular distinctive color hue and saturation in the CIE color chart.

61. The method defined in claim 60, wherein the relative size of each particular portion varies in accordance with color-picture information.

* * * * *

UNITED STATES PATENT OFFICE
CERTIFICATE OF CORRECTION

PATENT NO. : 3,957,354

DATED : May 18, 1976

INVENTOR(S) : Karl Knop

It is certified that error appears in the above-identified patent and that said Letters Patent are hereby corrected as shown below:

Column 1, line 47, before "characteristics" insert --color--

Column 5, line 52, change "symmetriic" to --symmetric--

Column 10, line 13, change "width" to --light--

Column 10, line 13, change "light" to --width--

Column 10, line 33, change "is" to --if--

Column 12, line 56, change "respectiive" to --respective--

Column 13, line 6, change "respectiive" to --respective--

Column 15, line 51, change "side" to --size--

Column 16, line 31, change "different" to --diffraction--

Column 17, line 37, change "respectiive" to --respective--

Signed and Sealed this

Seventeenth Day of August 1976

[SEAL]

Attest:

RUTH C. MASON
*Attesting Officer*

C. MARSHALL DANN
*Commissioner of Patents and Trademarks*